United States Patent
Riedl

(10) Patent No.: US 8,695,883 B2
(45) Date of Patent: Apr. 15, 2014

(54) DATA STORAGE CARD AND METHOD FOR THE MANUFACTURE OF A DATA STORAGE CARD

(75) Inventor: Josef Riedl, Attenkirchen (DE)

(73) Assignee: Giesecke & Devrient GmbH, Munich (DE)

( * ) Notice: Subject to any disclaimer, the term of this patent is extended or adjusted under 35 U.S.C. 154(b) by 203 days.

(21) Appl. No.: 12/997,450

(22) PCT Filed: Jun. 19, 2009

(86) PCT No.: PCT/EP2009/004453
§ 371 (c)(1),
(2), (4) Date: Dec. 10, 2010

(87) PCT Pub. No.: WO2009/153056
PCT Pub. Date: Dec. 23, 2009

(65) Prior Publication Data
US 2011/0114731 A1 May 19, 2011

(30) Foreign Application Priority Data
Jun. 20, 2008 (DE) .......................... 10 2008 029 433

(51) Int. Cl.
*G06K 19/00* (2006.01)
(52) U.S. Cl.
USPC .......................................... 235/487; 235/488
(58) Field of Classification Search
USPC .......................... 235/487, 492, 488, 486, 454
See application file for complete search history.

(56) References Cited

U.S. PATENT DOCUMENTS

| | | | |
|---|---|---|---|
| 4,756,557 A | 7/1988 | Kaule et al. | |
| 5,830,561 A * | 11/1998 | Hagner | 428/195.1 |
| 5,928,788 A * | 7/1999 | Riedl | 428/411.1 |
| 6,776,933 B1 | 8/2004 | Chatwin et al. | |
| 2005/0040242 A1* | 2/2005 | Beenau et al. | 235/492 |
| 2006/0249951 A1* | 11/2006 | Cruikshank et al. | 283/92 |
| 2008/0272513 A1* | 11/2008 | Stenzel | 264/173.17 |
| 2010/0026943 A1* | 2/2010 | Jagt et al. | 349/115 |

FOREIGN PATENT DOCUMENTS

| | | |
|---|---|---|
| AU | 3378084 A | 4/1985 |
| DE | 69901886 T2 | 11/2002 |
| DE | 10 2004 013 201 A1 | 10/2005 |
| EP | 0185396 A2 | 6/1986 |
| EP | 0 640 940 A2 | 3/1995 |
| EP | 0 707 282 A2 | 4/1996 |
| GB | 2 348 394 A | 10/2000 |
| JP | 267543 A | 10/1997 |

OTHER PUBLICATIONS

International Search Report in PCT/EP2009/004453, Jan. 28, 2010.

* cited by examiner

*Primary Examiner* — Thien M Le
(74) *Attorney, Agent, or Firm* — Bacon & Thomas, PLLC

(57) ABSTRACT

A data carrier card and a method for producing a data carrier card, in particular a chip card or magnetic stripe card. The data carrier card has a card body having one or several foils, where the foil or at least one of the foils is a coextruded foil having at least two areas with different material properties. The use of coextruded foils makes it possible to form in a simple manner different areas in the card body which differ from each other in material quality. In particular, it is possible to form for example a data carrier card with a card body having a plurality of alternating opaque and transmissive strips or with window strips and/or windows enclosed in the surface of the card body.

19 Claims, 4 Drawing Sheets

DATA STORAGE CARD AND METHOD FOR THE MANUFACTURE OF A DATA STORAGE CARD

FIELD OF INVENTION

This invention relates to a data carrier card, in particular a chip card and/or magnetic stripe card, and to a method for producing a data carrier card.

BACKGROUND

Data carrier cards are usually manufactured nowadays from plastic foils, for example by several foils being laminated together to form a card body, whereby the card body is normally punched out of the foils and subsequently processed further in order to provide on the card body a corresponding data storage means or data processing means, in particular in the form of a microchip or a magnetic stripe.

In general, plastic foils can be produced by extrusion processes wherein a molten stream of plastic material is melted in an extruder and pressed through a nozzle to form the foil.

In the print DE 10 2004 013 201 A1 there is described a so-called coextrusion process wherein at least two polymeric molten streams of different composition are merged to thereby produce foils having areas with different material properties.

In the print GB 2 348 394 A there is described a further process for coextrusion wherein a foil comprising longitudinal strips of various colors is formed between a lower and an upper layer.

In the production of conventional data carrier cards there exists the problem that areas with different material properties, such as zones designed in different colors, must be produced in separate processing steps, e.g. by measures of printing technology, which makes the production of such data carrier cards elaborate.

SUMMARY

The object of the invention is therefore to form areas with different material properties in a data carrier card in a simple manner.

The data carrier card according to the invention comprises a card body comprising one or several foils, wherein the foil or at least one of the several foils is a coextruded foil which comprises at least two areas with different material properties. The invention is based on the finding that foils produced by coextrusion can be employed for data carrier cards in suitable fashion in order to form areas with different material properties, in particular different surface areas. In this manner it is possible to omit separate processing steps for forming areas with different properties.

The card body of the data carrier card according to the invention has, in a preferred variant, several superposed foils which are laminated together or configured as a whole by coextrusion. At least one of the foils here is a coextruded foil, whereby the whole layer arrangement can also be formed by coextrusion, however, so that the layer arrangement can in this case also be equated with a single coextruded foil which has areas with different properties in the direction of the thickness of the foil and preferably also over the surface of the foil.

In a further embodiment of the invention, the card body likewise has several superposed foils, wherein at least a portion of the foils are formed from one material over the entire surface and are arranged on at least one side of the coextruded foil. In this manner it is possible to increase the stability of the card body. The foils formed from one material over the entire surface can be transmissive or opaque foils, whereby transmissive is understood to mean both completely light-transmissive, i.e. transparent, and partly light-transmissive, i.e. translucent.

In an especially preferred embodiment, the at least two areas of the coextruded foils or of at least one coextruded foil are formed from different materials. Likewise, the at least two areas can be formed from the same basic material with different additives. The various areas with different material properties can differ in particular in their optical properties. For example, at least one area of the at least two areas of a coextruded foil can be opaque and at least one other area of the at least two areas of the coextruded foil can be transmissive, in particular transparent or translucent. The optical properties of the areas can also differ with regard to their polarization properties. In particular, at least one area of the at least two areas can be polarizing, so that it only passes light with a predetermined polarization. In this manner it is possible to produce different optical effects in the card body in especially simple fashion.

In an especially preferred embodiment of the data carrier according to the invention, at least one area of the at least two areas of the, or at least one, coextruded foil is formed from more elastic and/or more hardwearing material than at least one other surface area of the at least two surface areas of the coextruded foil. If the data carrier card is employed later for example in an electronic identification book for identification of a person, in particular an area of the, or at least one, coextruded foil that is located at the seam of the later identification book is more elastic than an area of the coextruded foil not located at the seam of the later identification book. In this manner a high stability of the identification book is guaranteed in an area where the relevant identification data are preferably located (i.e. remotely from the seam), whereby at the same time a good handling of the identification book upon turning of the pages is guaranteed by the elastic area at the seam.

The different areas of the, or at least one, coextruded foil can be formed from any desired plastics. Preferably there are employed for this purpose one or several of the following materials: polycarbonate, PET (PET=polyethylene terephthalate), PETG (PETG=polyethylene terephthalate glycol), TPE (TPE=thermoplastic elastomer), TPU (TPU=thermoplastic elastomer, urethane-based), polyolefins, PA (PA=polyamide), PVC (PVC=polyvinyl chloride), ABS (ABS=acrylonitrile-butadiene-styrene copolymer).

In the data carrier according to the invention, the transitions between two neighboring areas of the, or at least one, coextruded foil can further be executed in any desired way, in particular in sharp and/or also smooth manner, whereby the properties of the transition can also change along a transition.

In an especially preferred embodiment of the data carrier card according to the invention, one or several coextruded foils each having at least one opaque area and at least one transmissive area are configured and/or arranged one over the other such that the data carrier card has at least one transmissive window and/or at least one transmissive window strip. This makes it possible to form a window area in a simple manner without additional processing steps. The window or the window strip can extend through the whole card body, but windows or window strips are also conceivable that do not go through the whole thickness of the card body but end at an opaque area of a foil.

In a further embodiment of the invention, the coextruded foil or at least one coextruded foil comprises a plurality of alternating strips, for example longitudinal strips, with different material properties. In particular, opaque strips and transmissive strips can alternate in the coextruded foil.

In a further embodiment of the data carrier card according to the invention, at least a portion of superposed coextruded foils with alternating opaque and transmissive strips are arranged such that the at least one window and/or the at least one window strip is formed by the arrangement. For example, at least a portion of superposed coextruded foils with alternating opaque and transmissive strips can be arranged such that opaque and transmissive strips of neighboring foils are superposed in each case. That is, the opaque strip of one foil lies precisely on or under the opaque strip of another neighboring foil, and the same applies to the transmissive strips. Likewise, at least a portion of superposed coextruded foils can be arranged such that opaque and transmissive strips of neighboring foils are oriented so as to be offset and/or rotated relative to each other, in particular rotated by an angle of 90°. There are therefore formed preferably limited windows within the surface of the foil.

The thickness of the card body of the data carrier card is between 80 μm and 840 μm, in a preferred variant of the invention. This guarantees a sufficient stability of the card body. In a further embodiment of the data carrier card according to the invention, the, or at least one, coextruded foil is printed or provided with a lacquering at least on one side. In this manner it is possible to produce further optical effects.

Besides the above-described data carrier card, the invention further comprises a method for producing such a data carrier card, wherein the card body of the data carrier card is formed by coextrusion of at least one foil such that the at least one foil has at least two areas with different material properties. The coextrusion is effected in particular with a multilayer nozzle of a coextrusion assembly and preferably at a temperature of substantially 230° C. and more, in particular at 250° C. In a further variant, one or several further foils are applied to at least one side of the coextruded foil by lamination, making it possible to form a multi-ply data carrier card. The production method usually comprises further steps, in particular the punching of the card body out of the coextruded foil or out of the multi-ply layer structure comprising coextruded foil and further foils, the application of a chip or a magnetic stripe and the like.

BRIEF DESCRIPTION OF THE DRAWINGS

Embodiment examples of the invention will be described in detail hereinafter with reference to the attached figures.
Therein are shown.

DETAILED DESCRIPTION OF VARIOUS
EMBODIMENTS OF THE DISCLOSURE

Figure 1:
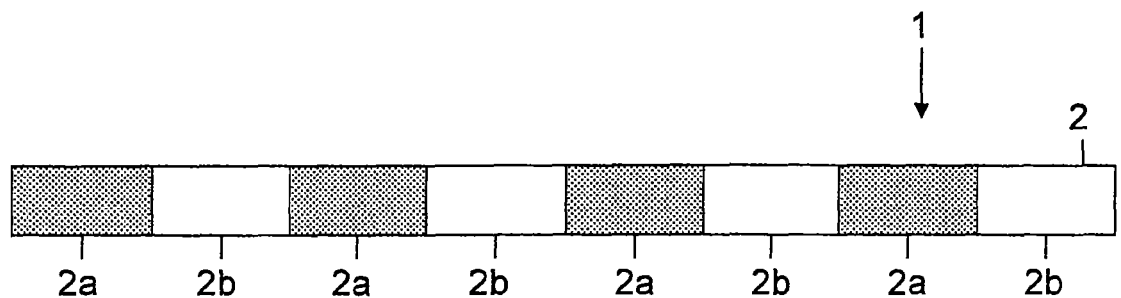
FIG. 1 to FIG. 3 cross-sectional views of three different embodiments of a card body of a chip card, according to the invention.

FIG. 1 shows in cross section a first embodiment of a card body according to the invention. This is a single-ply card body comprising a single plastic foil 2. Said foil is produced on the basis of a coextrusion process wherein several molten streams coming from different extruders are merged in a multilayer nozzle, so that there are formed in the foil different surface areas from the various molten streams. The molten streams differ here in their material properties. In the embodiment according to FIG. 1, a multiplicity of alternating longitudinal strips 2a and 2b are formed by the multilayer nozzle, whereby the strips 2a and 2b in each case belong to the same molten stream of a corresponding extruder. The molten stream resulting in the strips 2a is based on an opaque polymeric material, which is indicated by the dotted cross section in FIG. 1 and all further figures. Between two strips 2a there is a strip 2b which comes from a molten stream of transparent polymer.

Figure 4:
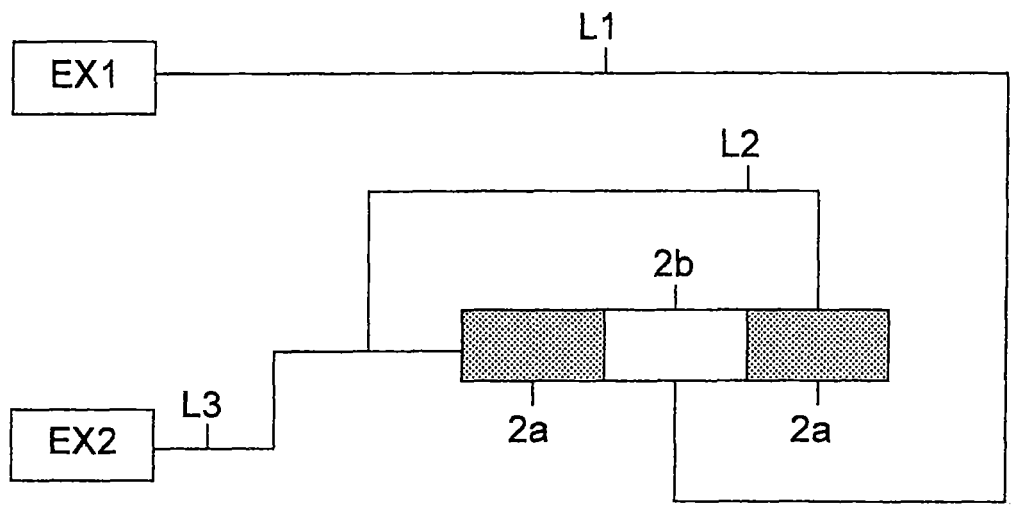
FIG. 4 to FIG. 6 three different embodiments of methods for producing the particular card bodies according to FIG. 1 to FIG. 3.

FIG. 4 shows schematically a corresponding coextrusion assembly for forming the card body according to FIG. 1. Through the extruder EX1 there is produced a molten stream for forming the transparent strips 2b, as indicated by a corresponding line L1. Further, through the extruder EX2 there is generated a molten stream for forming the opaque strips 2a, which is indicated by corresponding lines L2 and L3. The formation of the contiguous strips is effected with the help of a multilayer nozzle (not shown) having corresponding nozzle openings and feeds for the molten streams for forming the neighboring strips 2a or 2b. For reasons of clarity, only three neighboring strips 2 are shown in FIG. 4, whereby the foil cross section according to FIG. 1 is produced by multiple repetitions of alternating neighboring strips 2a and 2b.

Coextrusion processes are generally known, so that a detailed description of such processes and corresponding parallel multi-nozzle extrusion apparatuses for carrying out such processes will be omitted. Nevertheless, the use of coextrusion processes for producing card bodies comprising surface areas with different material properties is not known from the prior art. The coextrusion preferably takes place at the temperature of the molten streams of approx. 250° C. This results in a homogeneous foil without recognizable mechanical weak points or predetermined breaking points.

Figure 2:
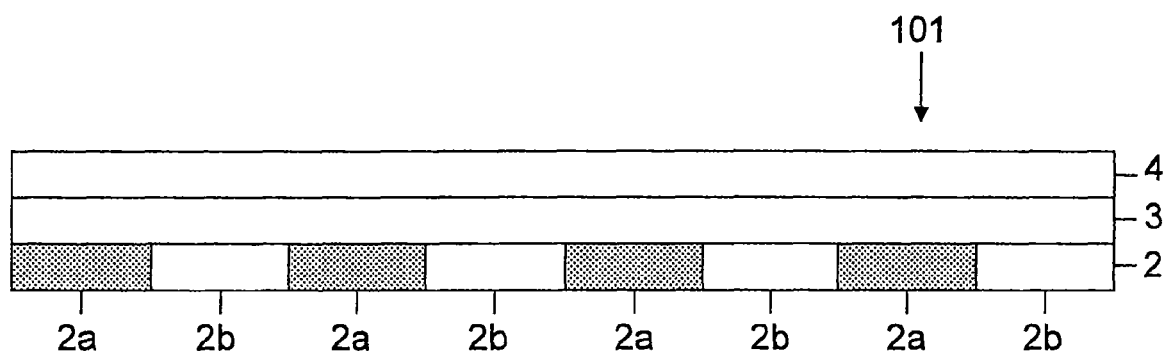

FIG. 2 shows a second embodiment of a card body according to the invention. Said card body 101 has, as in FIG. 1, a coextruded foil 2, which can be produced in the same way as the foil of FIG. 1. Unlike the card body 1 of FIG. 1, however, two further foils 3 or 4 are now arranged above the foil 2, whereby the foils 3 and 4 in the embodiment of FIG. 2 are transparent and consist of the same polymeric material over the entire surface. The foils can, in one embodiment, be manufactured separately and subsequently be laminated on the foil 2. The foils themselves are preferably likewise produced by extrusion. The use of further foils increases the stability of the card body. The individual foils can furthermore contain different formulation constituents, e.g. laser additives, security features, optical features and the like.

Figure 5:
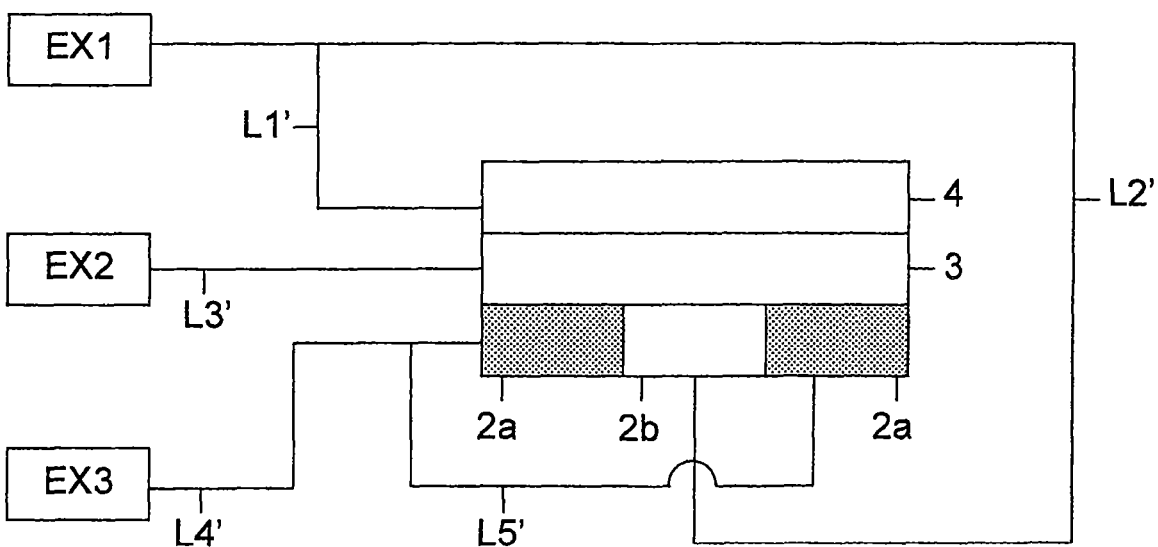

Instead of applying the foils 3 and 4 by lamination, it is also possible to form the layer structure according to FIG. 2 in a single coextrusion step with an accordingly configured and controlled multilayer nozzle. A corresponding coextrusion assembly for carrying out such a coextrusion is indicated schematically in FIG. 5. There are now employed three extruders EX1, EX2 and EX3. The extruder EX1 produces the molten stream of the uppermost layer 4 and the molten streams of the transparent strips 2b, as indicated by lines L1' and L2'. Through the extruder EX2 there is generated the molten stream for the middle transparent foil 3 (line L3'). In contrast, the extruder EX3 produces the opaque molten stream of the corresponding opaque strips 2a, as rendered by lines L4' and L5'. For reasons of clarity, only three of the strips of the foil 2 are rendered. The formation of the molten stream for the uppermost foil 4 according to the line L1' is optional and might be omitted, so that only a single additional foil 3 is formed on the foil 2. According to FIG. 5 there is realized a coextrusion process which produces different molten streams not only over the surface in the horizontal direction, but also in the direction of the thickness of the layer structure. The coextrusion thus also comprises the simultaneous production of several different foil layers.

Figure 3:
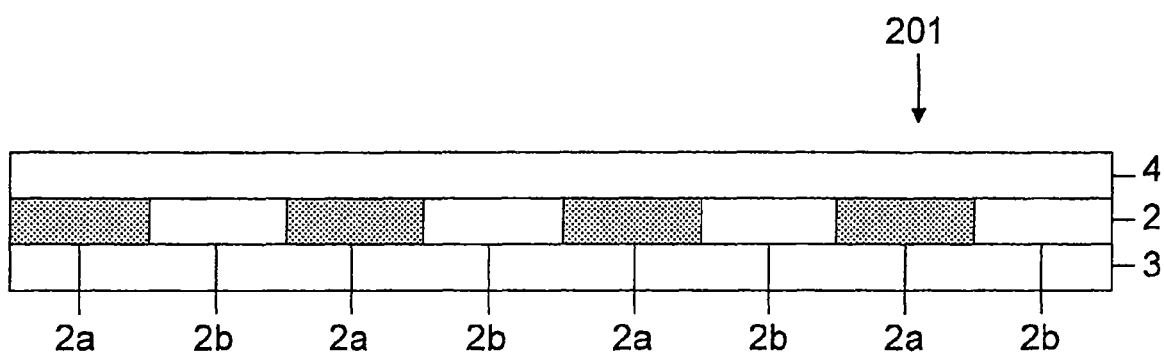
Figure 6:
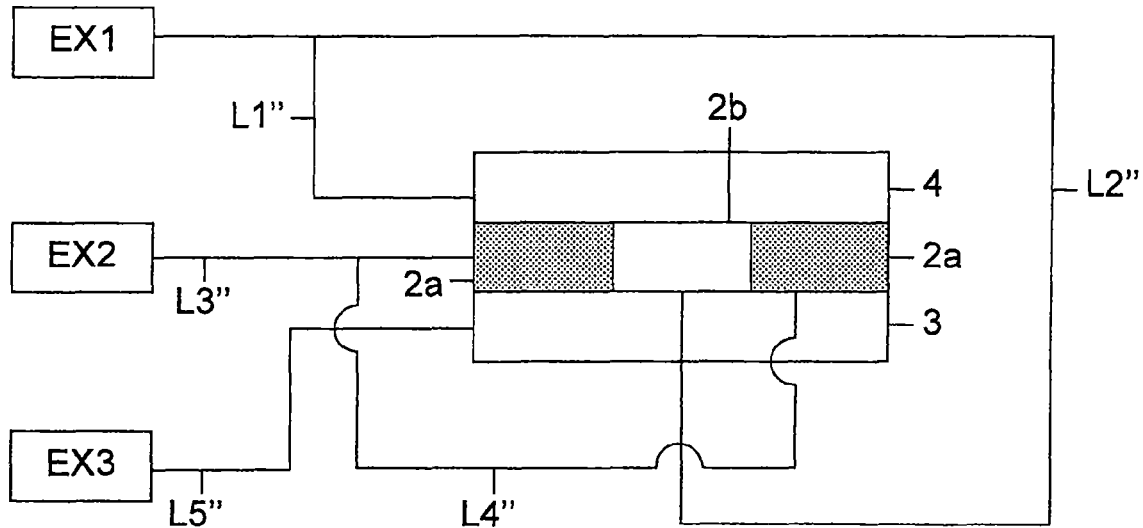

FIG. 3 shows a third embodiment of a card body according to the invention in a cross-sectional view. The card body 201 of FIG. 3 corresponds substantially to the card body 101 of FIG. 2. However, the foil 2 with the individual strips 2*a* and 2*b* is now arranged between the two transparent foils 3 and 4. This structure also obtains an elevated mechanical stability of the card body. As in FIG. 2, the foils 3 and 4 can be manufactured separately, in particular by extrusion, and subsequently be laminated on the coextruded foil 2. The layer structure of the foils according to FIG. 3 can, however, also be produced in a single coextrusion step. An extrusion assembly provided therefor is rendered schematically in FIG. 6. The assembly of FIG. 6 corresponds largely to the assembly according to FIG. 5. Via an extruder EX1 there is produced the molten stream for forming the upper foil layer 4 and the transparent strips 2*b* of the foil 2, as indicated by lines L1" and L2". The extruder EX2 generates the molten stream of the opaque layers 2*a* of the foil 2 (lines L3" and L4"). In contrast to the assembly of FIG. 5, there is now produced through the extruder EX3 a lower molten stream under the foil 2 for forming the foil 3, as indicated by the line L5'. The production of the different foil areas in the vertical and the horizontal directions is again effected here through an accordingly configured and controlled multilayer nozzle having a multiplicity of nozzle openings.

The card bodies according to FIG. 1 to FIG. 3 produced by the above-described methods have typical thicknesses of 80 µm to 840 µm, whereby thicker or thinner foils can be chosen depending on the case of application, and the thicknesses of the particular foil layers in a card body can also differ from each other.

Through the card-body foil production according to the invention based on coextrusion it is possible to form different variants of variously configured data carrier cards in a simple manner. In particular, corresponding additives in the individual different molten streams of the extruders can be used to produce different locally limited effects in the card bodies, such as light effects, color shift effects and the like. Further light effects can be obtained by corresponding printing of the foils. The individual materials constituting the strips of the foil 2 according to FIG. 1 to FIG. 3 can derive from the same basic material, but with different additives added for strips 2*a* and 2*b*. Likewise, it is possible to employ completely different polymeric materials for the individual strips 2*a* and 2*b*. The foils 3 and 4 according to FIG. 2 and FIG. 3 can also optionally consist of different materials or of materials with different additives.

With the coextrusion process according to the invention it is possible to produce in particular card bodies for an electronic passport document. The card body is formed here from a material that is flexible in the seam area of the passport to thereby guarantee a good turning of pages in the passport document. In contrast, the area of the card body on which the personal data of the passport are located is formed by a material that has a certain stiffness to thereby increase the stability of the document. Likewise, in cards with bending axes, the areas along the bending axis can be produced, by means of coextrusion, from more hardwearing material than the other areas. Those areas of material not located along the bending axis and thus requiring lower resistance can be produced from less expensive, less stable material. In this manner the costs for production of the card body are reduced.

As set forth above, the individual strips 2*a* or 2*b* of the foil 2 according to FIGS. 1 to 3 can be formed from the same basic polymeric material with different additives. For example, for the opaque areas 2*a* corresponding dyes can be added. Likewise, the transparent areas 2*b* can be configured so as to be not completely transparent, but only partly transmissive, i.e. translucent, whereby said areas can optionally also be dyed or pigmented. Likewise, the individual strips can have polarizing properties. Optionally the strips 2*a* and 2*b* can also consist of different polymeric materials. Particularly preferably, there can be used as plastic materials for the individual strips of the foil 2 or also for the foils 3 and 4 the following plastics, alone or in combination: poly-carbonate, PET, PETG, TPE, TPU, polyolefins, PA, PVC and ABS.

Further effects can be achieved by configuring the corresponding transitions between the different materials suitably depending on the case of application, e.g. smoothly or sharply. The foils 3 and 4 according to the embodiments of FIG. 2 and FIG. 3 can optionally be dyed to thereby create e.g. translucent applications or to produce colored gradations in transmitted light.

Figure 7:
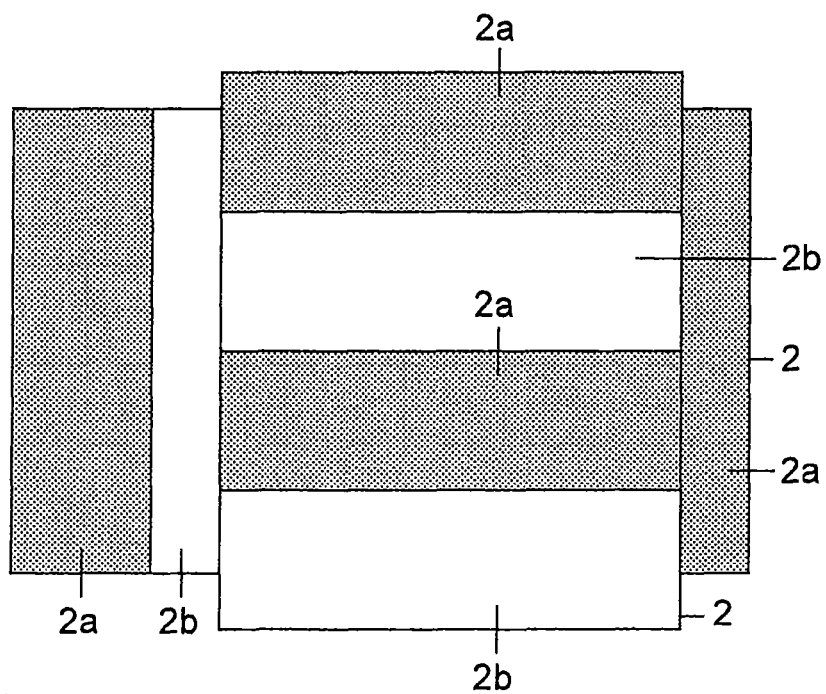
FIG. 7 a schematic representation of the arrangement of two superposed foils upon production of a card body according to a further embodiment of the invention.

In an especially preferred embodiment of the invention, card bodies are formed from a plurality of coextruded foils with different surface areas. This is indicated in the embodiment according to FIG. 7, whereby in this example two identical coextruded foils 2 with alternating opaque strips 2*a* and transparent strips 2*b* are arranged one over the other. The individual coextruded foils correspond in structure to the coextruded foil 2 according to FIG. 1. By offset or rotation of the layers relative to each other it is possible to produce card bodies with transparent windows. According to FIG. 7 such transparent windows arise through the strips of the lower foil being rotated by 90° relative to the strips of the upper foil. In the overlap areas between the transparent strips of the lower and upper foils there then arise corresponding square windows.

Figure 8:
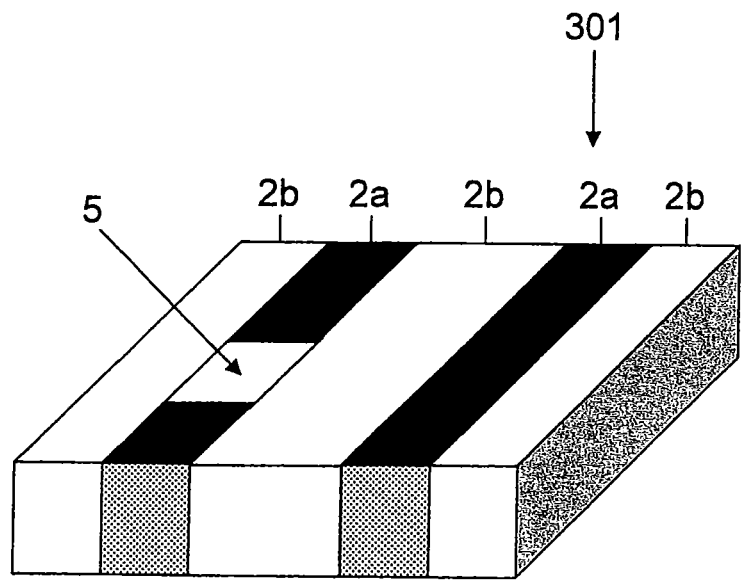
FIG. 8 and FIG. 9 perspective views of two further embodiments of card bodies of a chip card, according to the invention.

Optionally, the surface of the card body can be printed in subareas. FIG. 8 shows a card body 301 with printing. The card body 301 comprises a plurality of foils (not individually shown) with superposed opaque and transparent areas. This results in opaque strips 2*a* extending through the total thickness of the card body, and transparent strips 2*b* extending through the total thickness of the card body. The card body 301 is provided with a corresponding print 5, which is applied in the opaque area 2*a* in the embodiment of FIG. 8. The print can optionally also be configured such that it is located only in the transparent, or in the transparent and opaque, area of the card body. In particular, the printing can be configured such that corresponding window areas of predetermined size result on the transparent strips.

Figure 9:
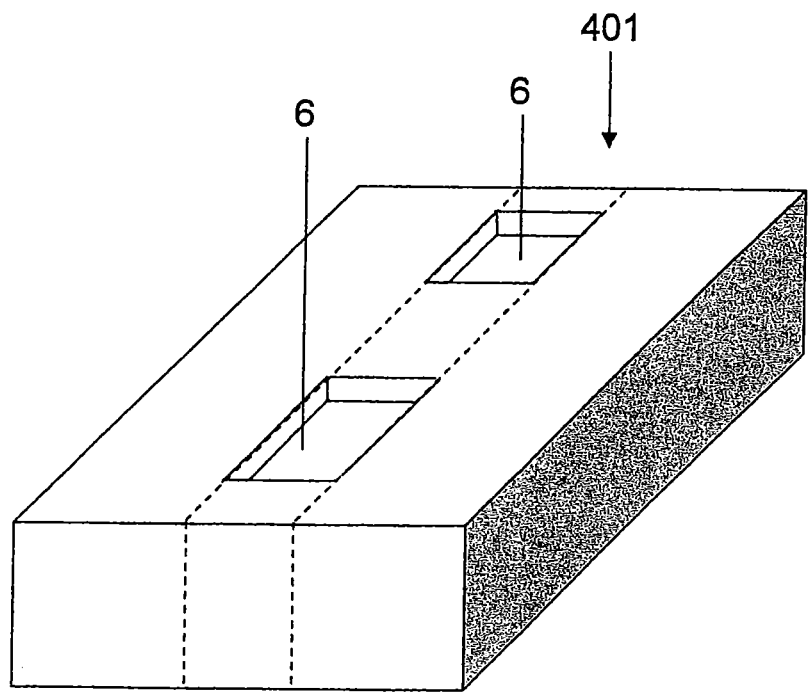

FIG. 9 shows a further embodiment of a card body 401 according to the invention wherein there are configured window areas 6 which extend only partly into the card body and not therethrough. Such recess-like window areas 6 are of advantage in particular when a card body 401 is to be provided later with an MLI (multiple laser image) or a CLI (changeable laser image). In the area of the windows 6 there can then be provided a greater layer thickness for receiving an MLI or a CLI. This in turn permits the configuration of the MLIs or CLIs with greater lens radii, thereby simplifying the production of the MLIs or CLIs. A card body as shown in FIG. 9 can be produced for example by a multilayer structure according to FIG. 7. The generation of window areas of different size can be obtained here for example by a variation of the width of the transparent or opaque strips of the foil 2.

As emerges from the above statements, the use of coextruded foils for card bodies of data carrier cards makes it possible to realize in a simple manner many different variants of cards with corresponding properties with regard to optics and material quality.

The invention claimed is:

1. A data carrier card comprising a card body comprising:
one or several foils, wherein the foil or at least one of the several foils comprises a single coextruded foil layer having at least two contiguous surface areas that are co-planar having different material properties,
wherein at least one first surface area of the at least two surface areas of the coextruded foil is opaque and at least one second surface area of the at least two surface areas of the coextruded foil is transmissive, and
wherein the at least one first surface area is formed entirely of a first material having at least one material property that is different than the at least one second surface area, said at least one first surface area and said second surface area being arranged to form at least a top surface of the single coextruded foil layer.

2. The data carrier card according to claim 1, wherein the card body comprises several, superposed foils disposed one upon the other which are laminated together.

3. The data carrier card according to claim 1, wherein the card body comprises several, superposed foils, wherein at least a portion of the foils is formed from one material over the entire surface and is arranged on at least one side of the coextruded foil.

4. The data carrier card according to claim 1, wherein the at least two surface areas of the coextruded foil are formed from the same basic material with different additives.

5. The data carrier card according to claim 1, wherein at least one surface area of the at least two surface areas of the coextruded foil is polarizing.

6. The data carrier card according to claim 1, wherein at least one surface area of the at least two surface areas of the coextruded foil is formed from more elastic and/or more hardwearing material than at least one other area of the at least two areas of the coextruded foil.

7. The data carrier card according to claim 6 for use in an electronic identification book, wherein an area of the coextruded foil that is located at a seam of the identification book is more elastic than an area of the coextruded foil not located at the seam of the identification book.

8. The data carrier card according to claim 1, wherein at least one area of the at least two surface areas of the coextruded foil comprises one or several of the following materials: polycarbonate, PET, PETG, TPE, TPU, polyolefins, PA, PVC, ABS.

9. The data carrier card according to claim 1, wherein at least a portion of the transitions between two neighboring surface areas of the coextruded foil is executed sharply and/or smoothly.

10. The data carrier card according to claim 1, wherein one or several coextruded foils each have at least one opaque surface area and at least one transmissive surface area is configured and/or arranged one over the other such that the data carrier card has at least one window and/or at least one window strip.

11. The data carrier card according to claim 10, wherein the at least one window and/or the at least one window strip extends through the card body and/or end at an opaque area of the card body.

12. The data carrier card according to claim 1, wherein the coextruded foil comprises a plurality of alternating opaque and transmissive strips, wherein at least a portion of superposed coextruded foils having alternating opaque and transmissive strips are arranged such that the at least one window and/or the at least one window strip is formed by the arrangement.

13. The data carrier card according to claim 12, wherein at least a portion of superposed coextruded foils having alternating opaque and transmissive strips is arranged such that opaque and transmissive strips of neighboring foils are superposed in each case.

14. The data carrier card according to claim 12, wherein at least a portion of superposed coextruded foils having alternating opaque and transmissive strips is arranged such that opaque and transmissive strips of neighboring foils are oriented so as to be offset and/or rotated relative to each other.

15. The data carrier card according to claim 1, wherein the card body comprises several, superposed foils disposed one upon the other formed simultaneously by coextrusion.

16. The data carrier card according to claim 1, wherein the at least one first surface area and at least one second surface area extend through a thickness of the single coextruded foil layer.

17. A method for producing a data carrier card comprising a card body comprising one or several foils, wherein the foil or at least one of the several foils comprises a single coextruded foil layer having at least two contiguous surface areas that are co-planar having different material properties, wherein at least one first surface area of the at least two surface areas of the coextruded foil is opaque and at least one second surface area of the at least two surface areas of the coextruded foil is transmissive, said method comprising the step forming the card body by coextrusion of at least one foil such that the at least one foil has at least two contiguous surface areas with different material properties, wherein the at least one first surface area is formed entirely of a first material having at least one material property that is different than the at least one second surface area, said at least one first surface area and said second surface area being arranged to form at least a top surface of the single coextruded foil layer.

18. The method according to claim 17, wherein the coextrusion is effected at a temperature of substantially 200° C. or at 230° C.

19. The method according to claim 18, wherein one or several further foils are applied by lamination to at least one side of the at least one coextruded foil.

* * * * *